United States Patent [19]
Gronnevik

[11] Patent Number: 5,147,270
[45] Date of Patent: Sep. 15, 1992

[54] EQUIPMENT FOR FOLDING AND JOINING BOXES MADE FROM FLAT OR BASICALLY FLAT MATERIALS

[75] Inventor: Oddbjørn Grønnevik, Nesbru, Norway

[73] Assignee: Norsk Hydro A.S., Oslo, Norway

[21] Appl. No.: 638,434

[22] Filed: Jan. 7, 1991

[30] Foreign Application Priority Data

Jan. 5, 1990 [NO] Norway .................................. 900059

[51] Int. Cl.$^5$ .............................................. B31B 1/46
[52] U.S. Cl. .................................... 493/141; 493/167; 493/133
[58] Field of Search ............... 493/122, 126, 127, 133, 493/141, 142, 143, 167, 168

[56] References Cited

U.S. PATENT DOCUMENTS

| | | | |
|---|---|---|---|
| 3,513,757 | 5/1970 | Frank | 493/143 |
| 3,593,623 | 7/1971 | Oakley | 493/133 |
| 4,090,903 | 5/1978 | Matsui | 493/133 |
| 4,896,790 | 1/1990 | Gronnevik . | |

*Primary Examiner*—Bruce M. Kisliuk
*Assistant Examiner*—Jack Lavinder
*Attorney, Agent, or Firm*—Wenderoth, Lind & Ponack

[57] ABSTRACT

An apparatus for folding and joining boxes formed from flat or basically flat box material includes a device for advancing box materials from stock or storage to a device for pre-treating the box materials by heating prior to welding or by application of glue, a device for folding the box materials and holding the box materials in a folded position until a joining operation is ended, and a device for transporting the thus formed boxes to storage or the like.

12 Claims, 3 Drawing Sheets

EQUIPMENT FOR FOLDING AND JOINING BOXES MADE FROM FLAT OR BASICALLY FLAT MATERIALS

BACKGROUND OF THE INVENTION

The present invention relates to an apparatus or equipment for folding and joining boxes formed from flat or basically flat box materials.

In Norwegian patent application No. 162335 is described a box for transporting fresh goods such as fresh fish and meat, medicines etc., the box having double side, top and bottom walls of thermoplastic material, the hollow space between the walls being filled with air or some other gas. The principle shape of the box is an essentially flat, hollow molding comprising a rectangular base portion and side portions and a cover portion integrally joined to extend outwardly from the base portion, whereby the box is formed by folding the side walls along score lines or lines of weakness and joining the side walls at corners of the box by means of welding or the like.

SUMMARY OF THE INVENTION

It is an object of the present invention to provide an apparatus for folding and joining boxes formed from flat, or basically flat box materials. It is further an object of the present invention to enable manufacture by such apparatus as simply and inexpensively as possible, but still with an efficiency and quality providing high productivity and a low level of rejects of the boxes produced thereby.

The invention includes a first device for advancing a box material from storage, stock or the like to a second device for pre-treatment of the box material by the supply of glue or by preheating prior to joining, a third device for folding the box material and holding it in a folded position until the joining is completed, and a fourth device for ejecting or transporting the thus produced box.

BRIEF DESCRIPTION OF THE DRAWINGS

The invention now will be further described by way of example and with reference to the accompanying drawings, in which:

FIGS. 1a and 1b respectively are a plan view of an example of a flat box material which the apparatus according to the invention is designed to fold and join and a section along lines 1b—1b in FIG. 1a;

DETAILED DESCRIPTION OF THE INVENTION

Figure 1B:
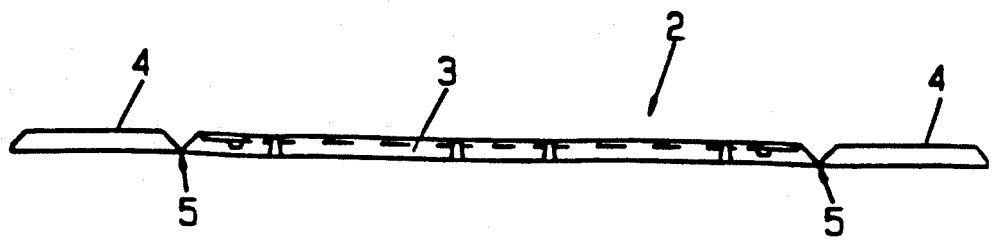
Figure 1A:
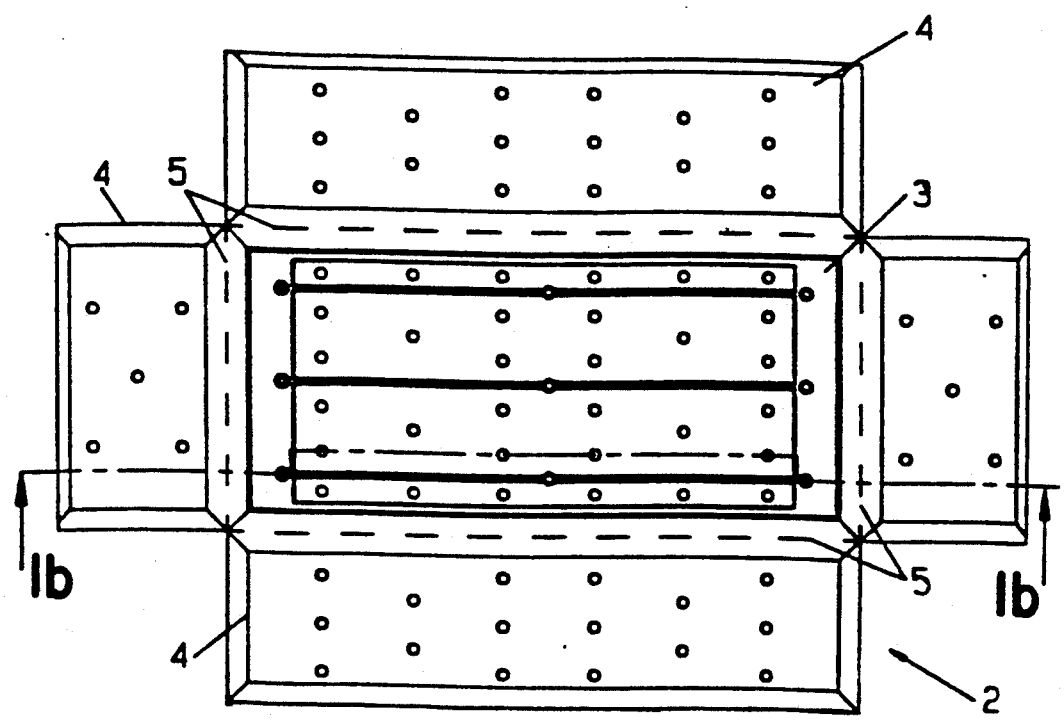

As mentioned above, FIGS. 1a and 1b show an example of a flat box material 2 which the apparatus according to the invention is designed to fold and join. The box material 2 comprises a rectangular base portion 3 and four side portions 4. Between the bottom portion 3 and side portions 4 are provided lines of weakness or "score lines" in the form of V-shaped grooves 5. The box is formed by folding the side walls 4 along the score lines 5 and thereafter by joining adjacent side walls to form corners of the box. The joining method may, depending on the type of material being used, be done by welding, gluing or the like.

Figure 2:
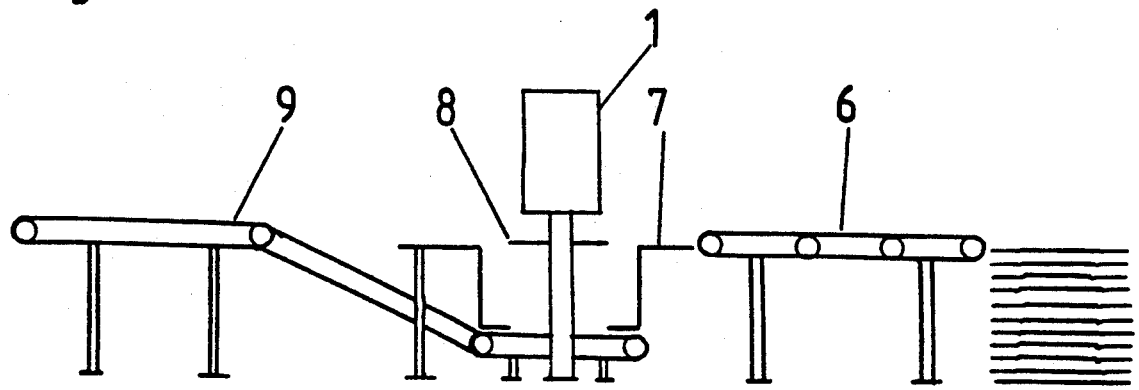
FIG. 2 is a schematic side view of the apparatus according to the invention.

The apparatus according to the invention for folding and joining such box materials comprises, as shown in FIG. 2, a conveyor device 6, a pre-treatment device 8, a folding device 7 and a conveyor device 9. The conveyor devices 6 and 9 may preferably be various types of endless conveyors and will not be further described. However, with regard to the pre-treatment device 8 and the folding device 7, these parts of the apparatus will be described in the following.

Figure 3:
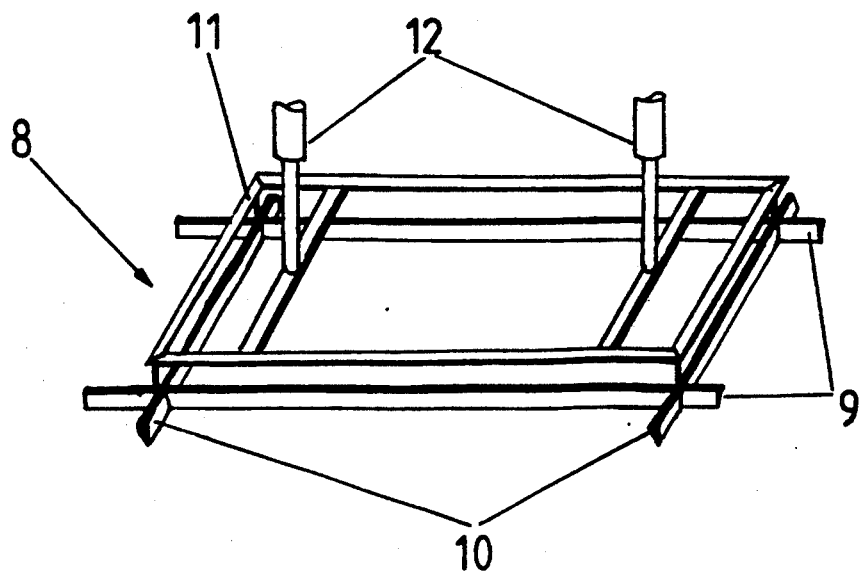
FIG. 3 is a perspective view, on an enlarged scale, of a part of the apparatus shown in FIG. 2 and including a device for preheating box materials prior to welding.

FIG. 3 shows an enlarged perspective view of the pretreatment device 8. In order to obtain a clear view the surrounding parts of the apparatus are not shown in FIG. 3. Also not shown are details of the pre-treatment device such as electric cables, etc. The expression "pre-treatment device" is employed herein due to the fact that different types of devices may be used, depending on the type of joining method being employed. In the following example the boxes are made of thermoplastic material and accordingly welding is chosen to be the joining method.

The pre-treatment device 8 includes heat elements 9, 10 that are designed and disposed so that they will fit into the V-shaped grooves 5 a=in the box materials 2. The heating elements are designed to heat (melt) the material in the area/surfaces of the V-shaped grooves. Immediately after such heating, by folding and pressing the side walls against one another at the corners of the thus formed box, welding connections are formed between the bottom and each of the side walls as well as between each adjacent pair of the sides. The heating elements are connected to a frame 11 which in turn may be lowered and lifted by means of pneumatic cylinders 12 or the like. To compensate for any misalignment with regard to the dimensions of the box materials and displacement of the V-shaped grooves, the heating elements 9, 10 can be moved in both transverse and longitudinal directions relative to the frame 11. Thus, the heating elements are self-aligning and will adjust themselves to correct positions relative to the grooves when the frame is lowered against an underlaying box material.

Figure 4:
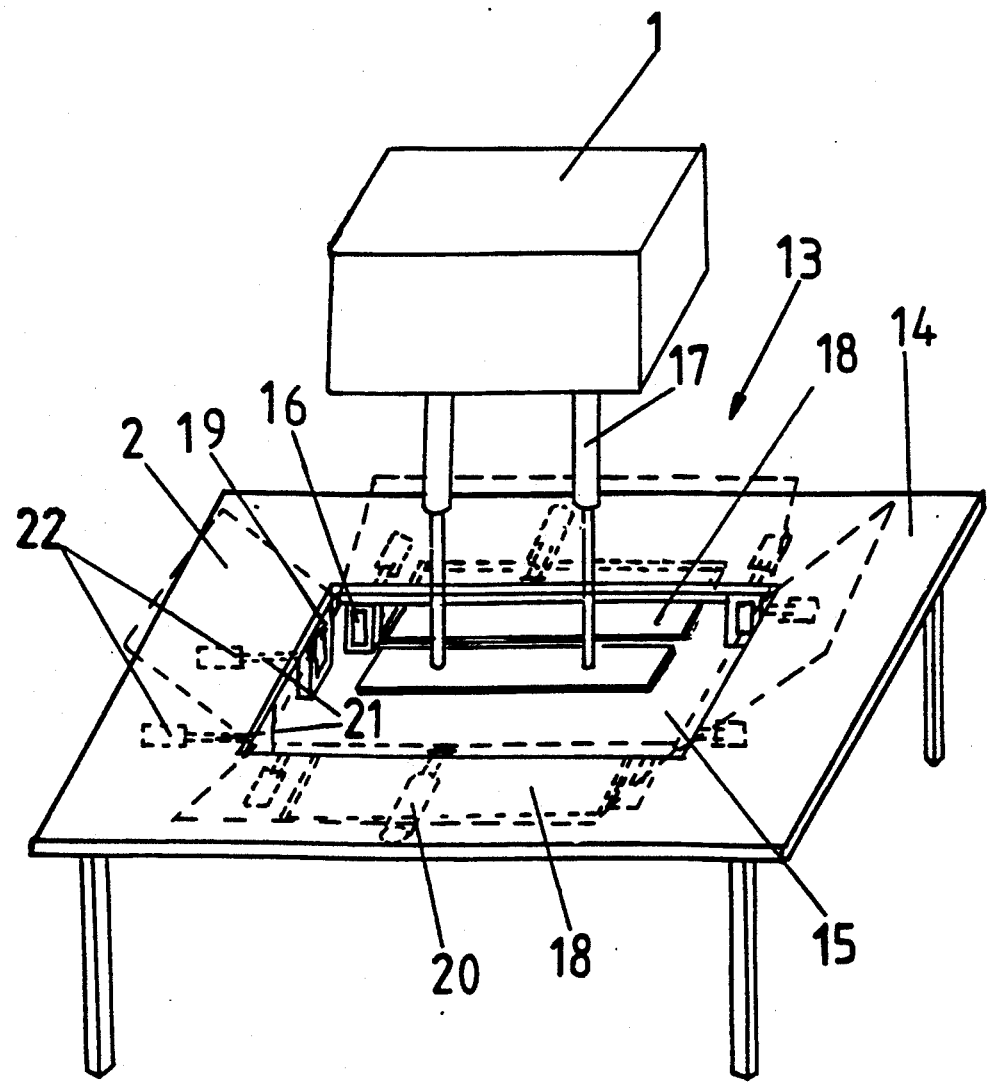
FIG. 4 is a perspective view, also on an enlarged scale, of another part of the apparatus shown in FIG. 2 and including a device for folding and joining the box materials.

The folding device 7 is disposed beneath the pretreatment device 8 and is shown in more detail in FIG. 4. Principly it includes a table-like construction 13 with a guide or die plate 14 which is provided with a rectangular opening 15. The dimensions of the opening correspond to the size of the box materials and are somewhat larger than the bottom thereof. Immediately beneath the corners of the opening 15 are provided pressure cushions 16. The cushions 16 are connected to plates 19 which in term are attached to the construction 13.

The apparatus according to the invention functions as follows. A box material 2 is moved over the guide or die plate 14 and is placed in a position above the opening 15 as indicated by the dotted lines in FIG. 4. The bottom 3 of the box material corresponds to and is aligned with the opening 15. The pretreatment device 8, i.e. the heat elements 9, 10 is thereafter moved to a resting position above the V-shaped grooves to heat the box material in the area of the grooves. Stoppers 21, provided at each corner of the opening 15, prevent the box material from being pressed through the opening during the heating operation. After completion of heating, the heating elements are lifted to their initial position and the stoppers 21 are withdrawn. A pressure device including pneumatic cylinders 17 or the like connected to an upper structure 1 presses the bottom 3 of the box material through the opening 15. Thereby, the side walls of the box material will be folded inwardly till they touch one another at adjacent ends. Stoppers 18 prevent the readily made box from falling downwardly. As soon as the box is moved through the opening and rests against the stoppers 18, air is supplied to the cushions 16 so that a uniform pressure is supplied against the sides of the box. Thereby is achieved an even distribution of forces acting in the welding zones at the corners of the box. Such uniform force distribution in turn provides sealed connections at the corners of the box. The box is held in this position until the material in the welding zones at the corners has solidified. Thereafter the air is withdrawn from the cushions 16, the stoppers 18 are retracted and the box falls downwardly to underlying conveyor 9 (see FIG. 2) and is transported to storage or the like.

Stoppers 21 and the stoppers 18 are shown in FIG. 4 to be movably disposed by means of pneumatic cylinders 22 and 20, respectively. However, it should be noted that other driving means could be used to move the stoppers, such as electric motors with screw mechanisms, electromagnetic devices or the like. This also applies to the other driven devices employed in connection with the apparatus.

It should also be noted that the drawings show only the principle features of the invention. Thus the invention, within the scope of the claims, may be subject to modification departing from what is shown in the drawings. Particularly it should be noted that the pre-treatment device 8 shown in FIG. 3 can have a different design if another joining method is used. If, for instance, gluing is used, another application device may be employed, such as a brush or the like being moved along guides.

I claim:

1. An apparatus for folding and joining portions of a flat or substantially flat box material and thereby forming a box, said apparatus comprising:
    a folding device including a table-like member having therein a rectangular opening and thereby defining a die;
    advancing means for forwarding a flat box material from stock or storage to a position on said table-like member and above said opening;
    whereby the box material may be folded by being caused to pass into said opening, thereby forming folded corners;
    pretreatment means for subjecting the box material, prior to folding thereof, to a treatment to enable folded portions whereof to be joined;
    first, upper retractable stoppers positionable beneath said opening to prevent the box material, during said treatment thereof by said pretreatment means, from being bent downwardly into said opening;
    second, lower retractable stoppers positionable beneath said opening to be abutted by the folded box material and thereby to support and prevent temporarily the folding box material from falling through said opening;
    pressurizable cushions positioned directly under corners of said opening to apply a uniform force distribution to the folded portions of the box material when the folded box material is supported by said second stoppers, thereby enabling the folded portions of the box material to be joined, thus forming a completed box; and
    conveyor means positioned to receive and discharge the completed box.

2. An apparatus as claimed in claim 1, wherein a respective said cushion is positioned beneath each side of each said corner of said opening.

3. An apparatus as claimed in claim 1, wherein a respective said cushion is positioned centrally beneath each said corner of said opening.

4. An apparatus as claimed in claim 1, wherein said cushions are selectively pressurizable by the injection thereinto of gas.

5. An apparatus as claimed in claim 4, wherein the pressure within said cushions is adjustable.

6. An apparatus as claimed in claim 1, wherein said pretreatment means applies glue to portions of the box material to be joined.

7. An apparatus as claimed in claim 1, wherein said pretreatment means comprises heating elements and means for moving said heating elements into direct contact with the portions of the box material to be joined.

8. An apparatus as claimed in claim 7, wherein said heating elements are positioned directly above said table-like member, and said moving means is operable to lower said heating elements into contact with the portions of the box material to be joined.

9. An apparatus as claimed in claim 1, wherein said folding device further comprises a pressing member positioned above said opening and operable to press a bottom section of the box material downwardly until the bottom section abuts said second stoppers, thereby causing the box material to be folded and to pass through said opening.

10. An apparatus as claimed in claim 1, wherein said cushions are provided with wear plates.

11. An apparatus as claimed in claim 1, wherein said cushions and said second stoppers are operable to be retracted upon completion of the box, whereby the completed box falls downwardly to said conveyor means.

12. An apparatus as claimed in claim 1, wherein said conveyor means comprises an endless conveyor.

* * * * *